Oct. 18, 1932.  J. D. ABRAM  1,882,682
MOLDING MACHINE
Filed Nov. 10, 1927  5 Sheets-Sheet 2

Inventor
John D. Abram

Oct. 18, 1932.  J. D. ABRAM  1,882,682
MOLDING MACHINE
Filed Nov. 10, 1927   5 Sheets-Sheet 3
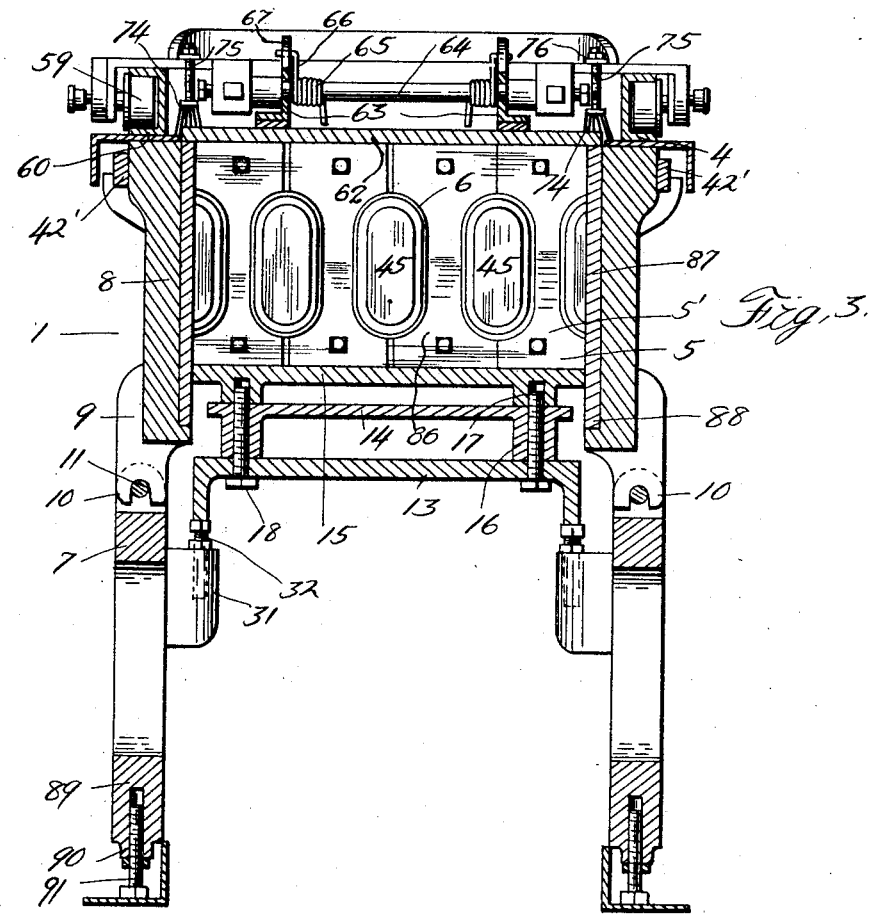
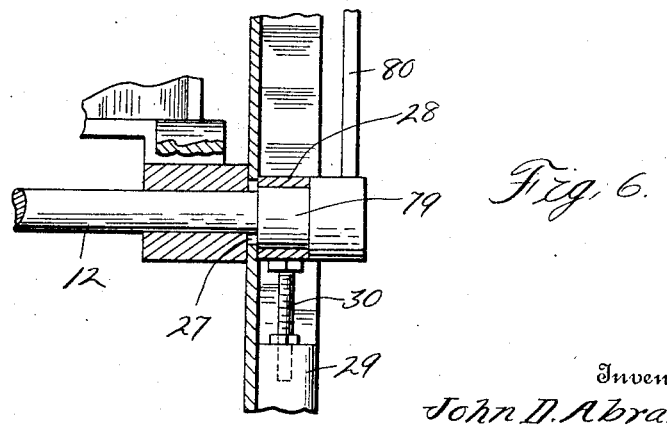
Inventor
John D. Abram
By Whittemore Hulbert Whittemore Belknap
Attorneys

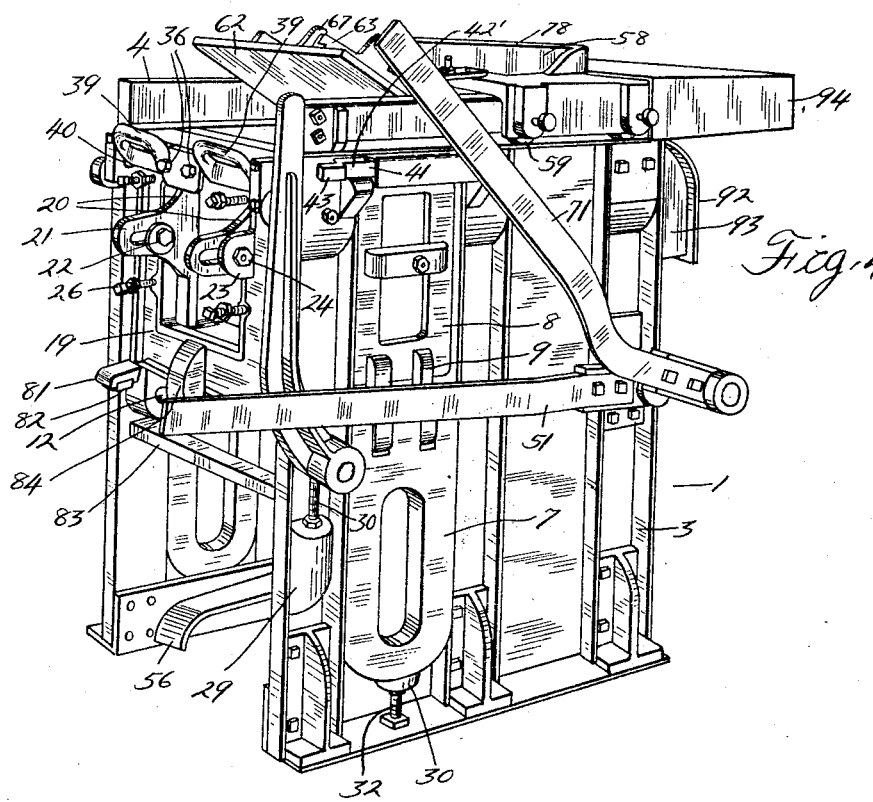

Oct. 18, 1932.    J. D. ABRAM    1,882,682
MOLDING MACHINE
Filed Nov. 10, 1927    5 Sheets-Sheet 5
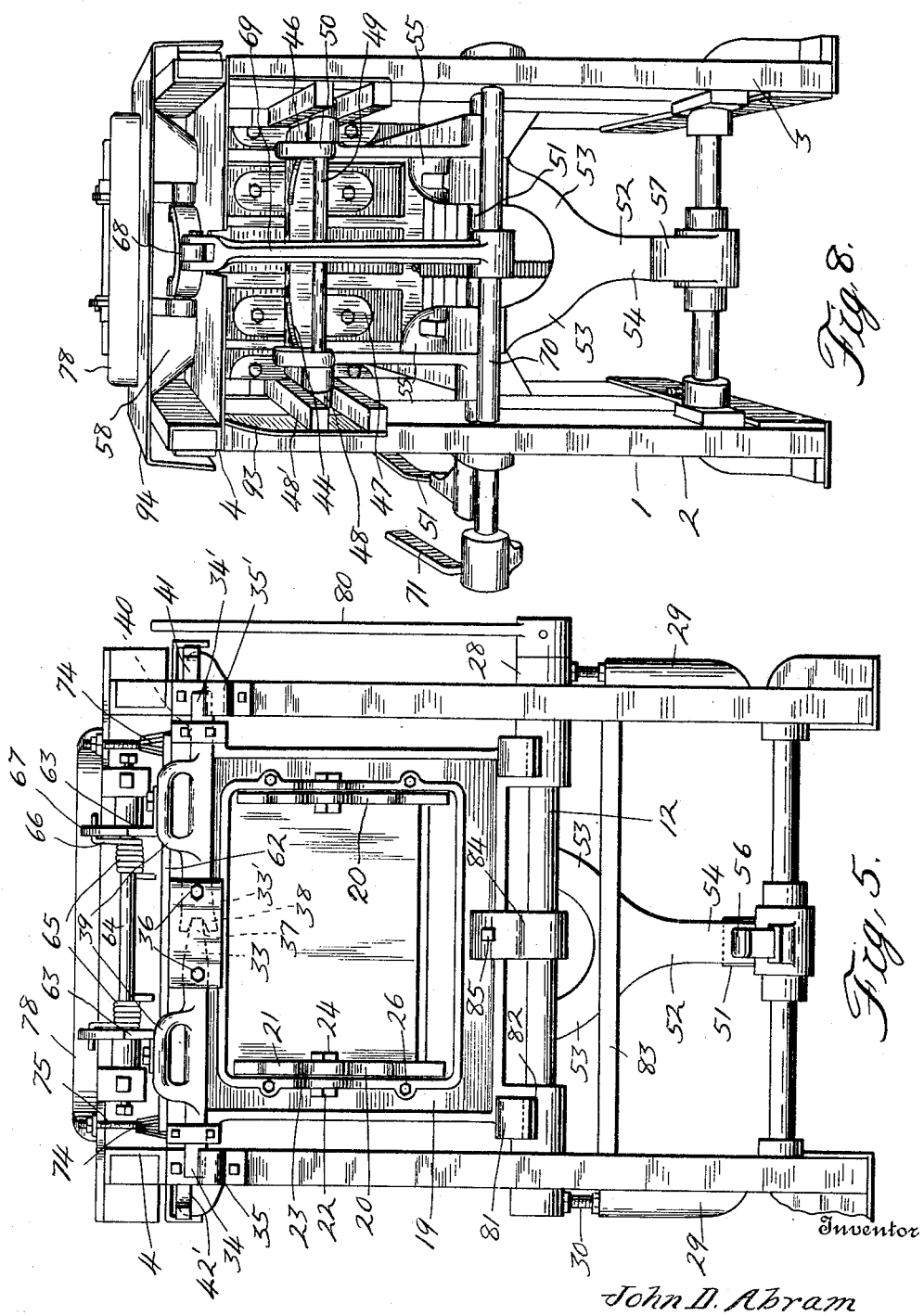
Inventor
John D. Abram
By Whittemore Hulbert Whittemore Belknap
Attorneys Patented Oct. 18, 1932

1,882,682

UNITED STATES PATENT OFFICE

JOHN D. ABRAM, OF DETROIT, MICHIGAN

MOLDING MACHINE

Application filed November 10, 1927. Serial No. 232,347.

This invention relates generally to molding apparatus and refers more particularly to machines for molding cement blocks having either plain or design faces as desired, and classified generally as "down face" machines. The present apparatus is of the type used in connection with a tamping machine wherein the material is tamped as it is fed into the mold.

It has been definitely determined that in the process of manufacture of concrete for building blocks or other purposes, the cement-water ratio has a definite relation to the strength of the product produced, and in machines formerly used it has been found that when the "cement-water" ratio is in correct proportion for producing a mixture giving the maximum ultimate strength to the product, the mixture is then too wet for removal from the molds in such machines without particles of the material clinging to the walls of the mold. This is due to the greater adhesiveness of the wetter material and to the construction of the mold necessitating the withdrawal of the material by a movement at right angles to the face of the walls or by the withdrawal of the walls of the mold with a movement at approximate right angles to the molded material, thereby forming recesses or pits in the outlines of the block. These objectionable features have been eliminated in the present apparatus by providing means for initially moving the block in parallel relation to the walls of the mold before it is removed therefrom, whereby a stripping movement is provided to break the adhesive contact between the mold walls and the faces of the molded material, causing them to separate cleanly.

In former machines of this type it has also been the common practice to assemble the core units in such a manner that the core enters the mold through an aperture provided in the back wall of same, the weight of the core resting on the lower part of the opening in the back wall, thereby causing an abrasive action between the bottom of the core and that part of the back wall in contact therewith. The frequent withdrawal and entry of the core in relation to the mold wears away the surface at the point of contact between the core and back wall, permitting a gradual lowering of the position of the core with relation to the material being molded, leaving the voids in the block out of center, with a resultant inequality of the webs of the block. It has been found that the manner of assembly above described where the cores are loosely mounted with relation to each other and where their overhung weight is supported by the back wall of the mold, permits their becoming misaligned during the process of tamping, thereby causing undue stress on the compacted material when the cores are withdrawn, disturbing the original density of the block, and causing cracked webs and poor quality in the block. It has further been found that the great force required to initially move or start the core from the tamped block by means of the usual hand lever will, in continuous process, greatly fatigue the operator of the machine.

The above objections have been eliminated by the present apparatus, first by providing a core carrier independent of the back wall of the mold and the rigid application of the cores thereto, in such manner that the said cores enter the mold through the apertures provided in the back wall of the mold but without contact with said back wall, the weight of the cores being fully borne by the said core carrier, and secondly, by providing foot operated means for effecting an initial rearward movement of the core carrier to loosen the cores from the block. Obviously, the cores and core carrier being rigidly assembled with relation to each other and held in operating position independent of the back wall or other walls of the mold, they must enter the mold and recede from the tamped material in a fixed line eliminating the possibility of damage to the original density of the block.

It is a common fault of other machines of the "down face" type that no means have been provided for removing the loose material from the top of the end plates, the result being that the finishing plate is prevented from making full contact with the end plate, leaving a surplus of material not fully compacted into the mold, making the molded unit untrue in dimensions. In the present apparatus this is eliminated by constructing the bottom opening of the strikeoff hopper, through which the material enters the mold, somewhat narrower than the mold and by further providing means for sweeping the tops of the end plates as the strike off hopper is moved forward and backward substantially as shown and described.

With these and other objects in view, the invention resides in certain novel features of construction, combinations and arrangement of parts as will be more fully described and particularly pointed out in the appended claims.

In the drawings:

Figure 3 is another section of Figure 1;

Figure 4 is another perspective view of the machine;

Figure 5 is a front elevation of the molding machine;

Figure 6 is a fragmentary view showing the means for eccentrically mounting one end of the door shaft;

Figure 8 is a rear elevation;

Figure 9 is a section similar to Figure 2 showing the strikeoff hopper in its forward position.

Figure 1:
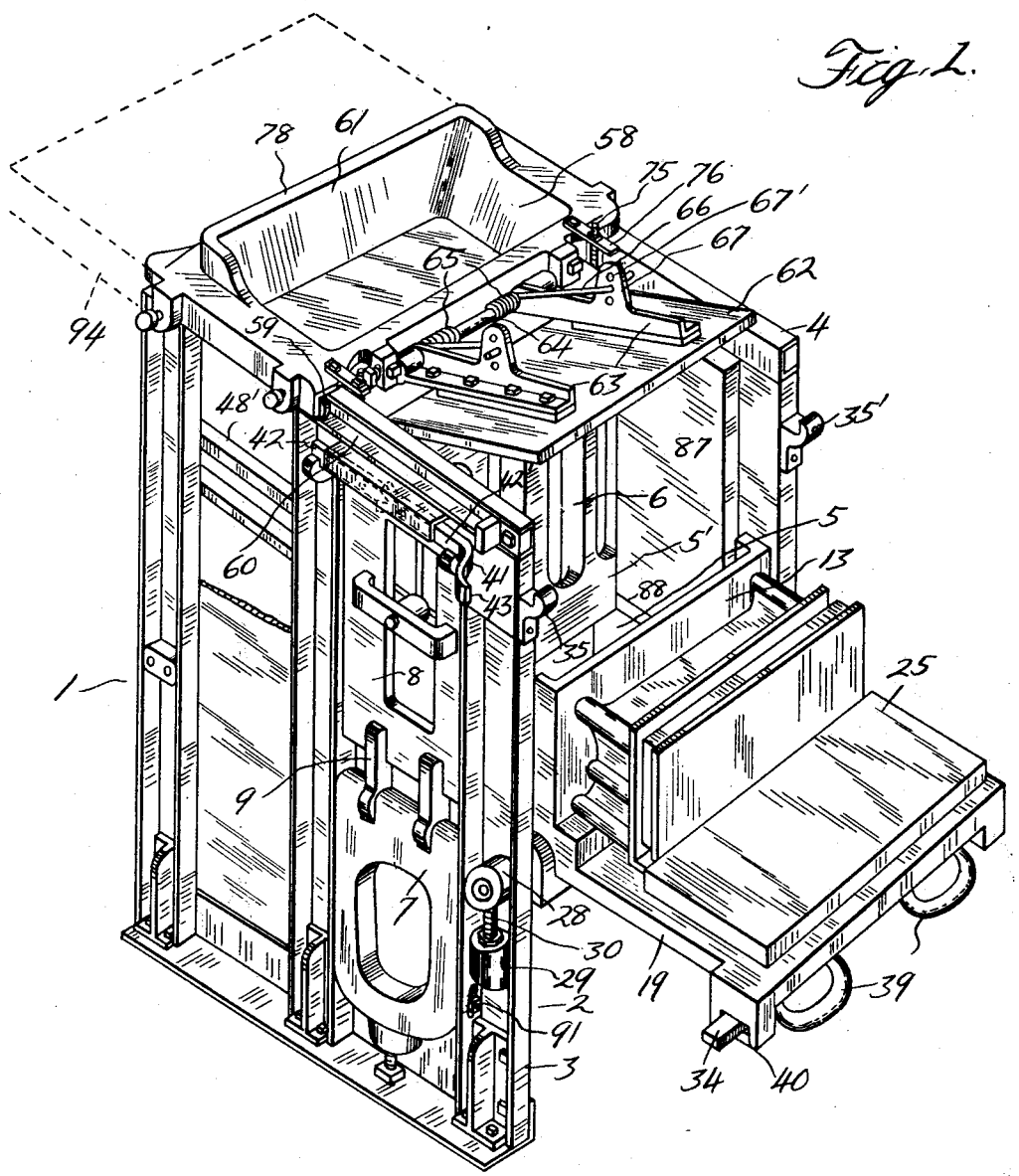
Figure 1 is a perspective view of my improved molding machine.

In the drawings the numeral 1 generally designates my molding machine consisting of the frame 2 made up of vertical channel bars 3 and the cross bars 4 joined together in any suitable manner.

The numeral 5 indicates the mold box consisting of the main back plate 5' rigidly secured between opposite channel bars 3 and provided with a plurality of core openings 6. Suitably secured between adjacent frame members are the oppositely disposed supports 7 upon which are hinged the removable end plates 8 of the mold box. The hinge straps 9 of each plate are provided with bifurcated portions 10 pivotally engaging the pintle 11 and which can be quickly disengaged therefrom, allowing the removal of each plate as desired.

Pivotally mounted upon a shaft 12 is an integral bottom and door construction which in Figure 1, is shown in open position. The bottom 13 is designed to support a filler plate 14 which in turn supports a bottom face plate 15. As shown in Figure 3 both plates 14 and 15 are provided with recessed bosses 16 and 17 at each corner respectively, the latter being screw threaded to receive the end of a bolt 18. With this arrangement different sized filler plates may be used depending upon the width of block to be molded, and it is also evident that face plates of different designs may be used as desired. The door or front wall of the mold box 19 is preferably provided with a central open portion in which is disposed a pair of adjustable plates 20, these plates having outwardly extending slotted arms 21, through which extend bolts 22. At opposite sides of the door opening are ears 23 having openings for receiving the bolts, the arrangement being such that when the bolt nuts 24 are screwed tightly upon the bolts, the plates 20 will be clamped in adjusted position. These plates are adapted to support a pallet 25 in different positions of adjustment and may be regulated for different size blocks. For facilitating the clamping action, bolts 26 are provided at different points in the door and are adapted to bear against the plates 20 after they have been clamped in the desired position. As will be noted the outer end of the filler plate is provided with a raised flat portion 27 upon which the pallet 25 rests when in adjusted position. It will also be noted that the bottom member 13 is provided with a raised flat portion 13' upon which the bottom of the adjusting plates 20 are arranged to rest and slide during their movement to different positions of adjustment.

In order to permit a vertical adjustment of the door 19 and bottom 13, each bar 3 is slotted while each end of the shaft is journalled in a bearing 28 which may be suitably bolted to its corresponding bar 3. Each bar is also provided with a support 29 in which is screw threadedly mounted an adjusting bolt 30. As will be noted the supports 7 are provided with projections 31 in which are also screw threadedly mounted bolts 32 corresponding to the bolts 30. It will be apparent that by unbolting the bearing members 28 the bottom 13 may be adjusted relative to the rest of the mold simply by rotating the bolts 30 and 32.

For retaining the door 19 in its vertical closed position, I provide a novel latch mechanism consisting of complementary latch members 33 and 33' having end portions 34 and 34' engageable in keepers 35 and 35'. Both members are pivotally mounted as at 36 upon the door adjacent their inner ends. The inner end of the member 33 is provided with a tooth portion 37 engageable in a recessed portion 38 in the end of the member 33', the arrangement being such that the unlatching movement of one member will also move the other member to unlatched position and vice versa. Preferably each member is provided with a handle 39 and as shown the top end portions of the door are provided with slotted projections 40 for guiding the respective latch members. Each of the end plates 8 is provided with a somewhat similar arrangement of latch mechanism 41 having the latch members 42, 42' operable in the same manner as the members 33, 33'. However in this instance only one handle 43 is provided for operating the latch.

Figure 2:
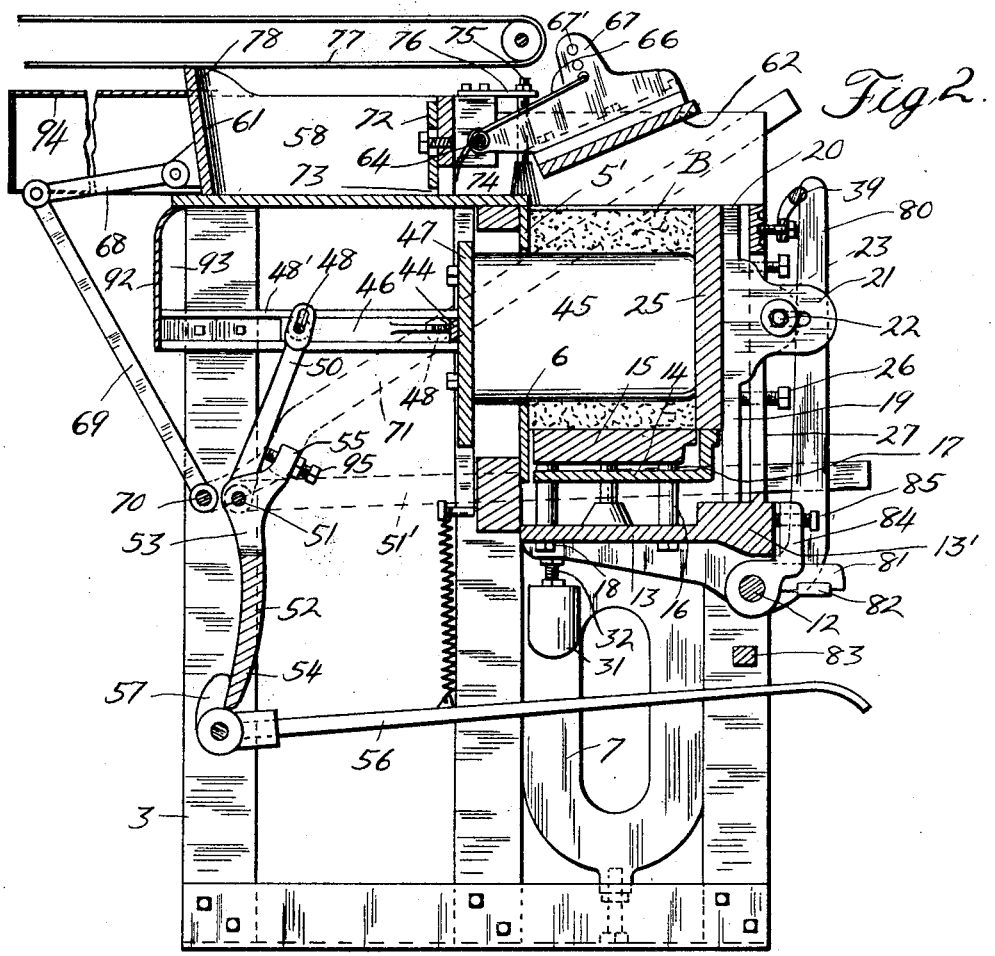
Figure 2 is a section of Figure 1 showing the strikeoff hopper in its back position before the finishing plate is placed in position.
Figure 7:
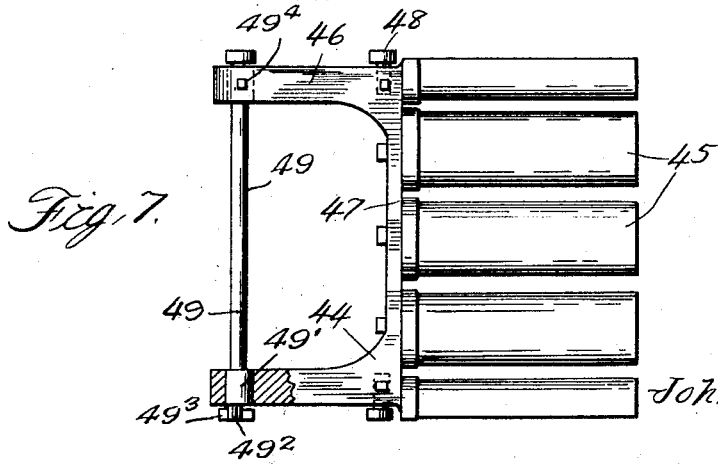
Figure 7 is a detail view of the core carrier supporting member.

Referring particularly to Figures 2 and 7, the numeral 44 designates a core carrier upon which a plurality of cores 45 are suitably mounted for horizontal movement into and out of the mold box through the openings 6. As shown, the carrier comprises an integral casting consisting of a horizontal carriage 46 and vertical core attaching portions 47 to which the cores are rigidly connected. To each side of the carriage are secured rollers 48 which are adapted to slide in tracks 48' mounted upon opposite sides of the frame. To the rear of the carriage is journalled a rod 49 engageable with a pair of slotted bars 50 which are in turn rigidly mounted upon the cross shaft 51, this shaft being journaled in the frame 1. For actuating the core carrier, a hand operated lever 51' is secured to the shaft 51. When this lever is moved in an upward direction, the bars 50 are moved rearwardly carrying with them the carriage 46, and core members 45. As explained hereinabove, this arrangement provides a greatly improved construction due to the fact that the carrier forms a strong supporting member independent of the back wall of the mold box, to which the core members are rigidly secured. The core members are adapted to pass through the openings in the back wall without touching the sides and because of their rigid mounting upon the carrier, the continual tamping operation does not effect a disalignment of the cores as has been the case in former machines.

The shaft 49 is provided with enlarged portions 49' which are received in suitable openings in the carriage 46, these portions having projecting eccentrically therefrom stubs $49^2$ upon which are concentrically mounted, rollers $49^3$. Suitable set screws $49^4$ are provided to secure the shaft against rotation. With the above arrangement the cores may be easily and quickly adjusted relative to the back plate by unscrewing the screws $49^4$ and turning the shaft 49. By reason of the eccentricity of the portions 49' to the stubs $49^2$ the former will constitute cams and either raise or lower the carriage and cores about the rollers 48 as a pivot, thus compensating for any wear in the parts which might otherwise effect the correct positioning of the cores relative to the back plate.

As brought out above, the force required to initially move the core member away from the block, is very great and I have therefore provided means for eliminating this objectionable feature. Freely mounted upon the shaft 51 is a lever 52 consisting of the diverging arms 53 and the depending portion 54. Each arm is extended laterally outward to form a finger 55 which is adapted to engage one of the bars 50. Upon the lower portion of the frame 1 is suitably journaled, a foot lever 56 having integrally secured thereto, the upwardly projecting arm 57 arranged to engage the lower extremity of the depending portion 54.

The lever 52 is balanced on the shaft 51 so that the portion 54 will lightly contact with the projection 57 in its inoperative position. However when the foot lever 56 is depressed, the projection 57 will move in a forward direction carrying with it the portion 54 and causing the lever 51 to swing about its pivot and thereby force the fingers 55 against the bars 50, moving the same rearwardly. This action also causes the movement of the core carrier and thereby effects an initial movement of the core members away from the block B. It will of course, be understood that this initial movement is very slight and is designed merely to loosen the core members from the blocks so that when the hand lever 51' is actuated to move the core members entirely out of the mold box, the force exerted by the operator will be negligible as compared with that necessary to initially move the cores, and by reason of the fact that the lever 56 is foot operated, it will be readily apparent that the initial expelling force will not require much effort from the operator.

Slidably mounted upon the top of the machine is a strikeoff hopper 58 which is adapted to be moved to a position directly over the mold box, as shown in Figure 9, when the material is to be deposited in the box. This hopper is provided with rollers 59 slidable in the track 60 and has the downwardly and inwardly inclined walls 61. Formerly the lower edges of the walls were terminated in the rear of the end plates 8 so that when the material was emptied into the mold box, some of it would be deposited upon the top edges of these plates and would therefore be further packed thereon by the tamping operation. This is objectionable because of the fact that when the top or finishing plate was placed upon the box, the edges of the under side of this plate would be prevented from contacting with the top of the end plates so that in many instances the size of the block would be increased beyond the correct dimension.

This objectionable feature is eliminated in the present machine by so designing the hopper 58 that the lower edges of the walls 61 will terminate a slight distance in front of the end plates. Thus none of the material will be permitted to contact with the top portions of these end plates so that when the top or finishing plate 62 is placed in position, the side edge thereof will readily engage the top portions of the end plates when the tamping operation is resumed. As shown in Figure 9 the portion 59' of each stub shaft $59^2$ is formed eccentric thereto so that a slight rotation of the shaft in the hopper will raise or lower its respective roll 59, thus compensating for wear in the track 4 and permitting the hopper to be adjusted relative to the top of the mold box.

As clearly shown in Figures 1 and 2 the finishing plate 62 is hingedly mounted upon the strikeoff hopper and is normally retained in raised position. This is accomplished by providing the plate with a pair of hinge arms 63, pivotally mounted upon a pintle 64. A pair of coil springs 65 are wrapped upon the pintle, each spring having one end thereof extending downwardly between said pintle and the adjacent hopper wall and bearing against said wall, while each outer end is extended as at 66 and is engaged in an ear 67 of its corresponding arm 63. Preferably each ear is provided with a plurality of apertures 67' for receiving the outer end of its respective spring. This is to permit a certain latitude for adjusting the tension of the springs.

While any suitable means may be employed for moving the hopper back and forth, I preferably provide a pair of pivotal levers 68 and 69 positioned centrally of the hopper so as to equally distribute the actuating force and thereby provide for the smooth and even movement of the hopper.

The lever 69 is rigidly secured to a cross shaft 70 journalled in the frame 1 and which in turn supports a hand lever 71 at one side thereof. The actuation of this lever 71 will move the hopper and finishing plate back and forth in the track 60.

Because of the fact that some aggregates compact more readily than others, it is necessary that some means be provided for permitting just the correct amount of material to project from the top of the mold box previous to the placing of the finishing plate 62 in position above the box. This is taken care of by providing a vertically adjustable plate 72 upon the front wall of the hopper. It will be noted that the lower edge of the front wall of the hopper is terminated short of the other walls, leaving an opening 73. The operator knowing the compacting qualities of the material being used will therefore adjust the plate 72 upon the wall so that the lower end thereof will project a predetermined distance below the lower end of the wall. Thus when the hopper is moved rearwardly from the mold box, it will carry with it all of the material projecting above the lower end of the plate 72.

During the filling and tamping operation some of the material will of course, fall upon the top edges of the end plates. In order to insure a clean top surface for permitting accurate engagement of the finishing plate with the end plates I provide a pair of brushes 74 supported upon and traveling with the hopper. Each brush is provided with a set screw 75 which is adjustably mounted upon an arm 76 suitably secured to the hopper. It will be apparent that as the hopper is moved back and forth each brush will sweep aside any of the material resting upon the top of the plates 8.

It will be noted that the molding machine is adapted to be placed directly below a belt conveyor 77 for transferring the material to the mold box. Very often some of the material will adhere to the belt and be carried upon the lower side thereof. In order to prevent such action, I provide the rear portion of the hopper with an apron 78 which is adapted to lightly contact with the lower surface of the belt so that when the hopper is operated, the apron will scrape off any particles which would otherwise adhere to the belt.

Referring particularly to Figure 6, it will be noted that the end portions 79 of the shaft 12 are formed eccentrically to the remainder of the shaft. It is therefore evident that when the lever 80 (which is secured to one end of the shaft) is actuated, the portion of the shaft between the eccentrics will be moved a short distance in a vertical and forward direction. This eccentric movement of the shaft 12 will obviously cause a like movement of the door 19 and bottom 13, raising them upwardly and outwardly sufficiently to effect a movement of the block B relative to the back and end plates 5' and 7 respectively, breaking the suction therebetween and permitting air to flow between the block B and back plate. This will prevent any pitting of the walls of the block and insure the removal thereof from the mold box in excellent condition. It will also be noted that the vertical movement of the door will elevate the latch members sufficiently to disengage the ends thereof from the keepers 35 and 35' so that the door may be lowered simply by grasping one of the handles 39 without the necessity of unlatching the members 33, 33'.

Referring now to Figures 2 and 4 the front door 19 is provided near its pivot point with a pair of spaced lugs 81, the bottom faces of which are provided with rubber members 82. When the door is opened to lowered position these faces will abut against a cross rod 83 and act as cushioning elements in preventing further movement of the door. Rigidly secured to the shaft 12 is a centrally disposed arm 84 which is adapted to rotate with the shaft and to engage the cross rod 83 for limiting the rotating movement of the shaft and consequently the downward movement of the lever 80. This arm is capable of supporting the door in its open position in the event that the rubber members 82 yield too freely, but its main function is to return the door to its closed position upon upper movement of the lever 80.

When blocks are to be molded of dry material, it will be unnecessary to intially move the blocks relative to the walls of the mold and the door may therefore be opened to remove the block as soon as the molding operation is completed. For this reason the arm 84 is tapped to receive a screw threaded bolt 85 and the door is also tapped so that when the bolt 85 is screwed into the tapped holes, the arm and door will be rigidly secured together. It will therefore be evident that upon the downward movement of the lever 80, the door will also be moved to open position at the same time.

Referring to Figures 1 and 3 it will be noted that the openings 6 in the back plate 5' extends from the top to the bottom thereof. This is to permit the use of a number of different sized core plates 86, each plate consisting of a plurality of sections forming openings of a size corresponding to the size of block to be molded.

Each plate is so constructed that the openings thereof will be in vertical alignment with the openings in the back plate but of course the set of openings of each plate vary in length with respect to those of the back plate.

It will also be noted that each end plate 8 is provided with a removable and reversible face portion 87 suitably secured thereto and adapted to rest upon a shoulder portion 88 of the end plate.

In other machines of the down face type, a great source of trouble and expense was caused by the top or finishing plate resting and functioning on top of both the end plates and back wall of the mold, the top of said end plates and top of said back wall being in a level plane. The constant pounding of the finishing plate directly on top of said walls with the unavoidable layer of aggregate in between quickly wore away the inner edges thereof, causing frequent and costly replacements. In the present apparatus, this is overcome by extending the back plate 5' higher than the end plates and this permits the edge of the finishing plate adjacent the back plate, to function along side the back plate and on top of the end plates only. This method of assembly eliminates the wear on the top inner edge of the back plate, preserving its usefulness and insuring a sharp, well drawn back edge to the molded block.

Preferably each support 7 is provided with a head portion 89 at its lower end which is tapped to receive a set screw 90, the head of which is adapted to rest upon the lower portion of the frame. Upon rotating the set screw the member 7 may be vertically adjusted after the usual bolts 91 have been loosened.

Preferably I provide at different points, shields for protecting the mechanism from possible injury. In Figure 4 I have shown a shield 92 supported upon the overhanging plates 93 at the rear of the machine while to the back portion of the hopper I place another shield 94 for protecting the top portion during the tamping operation. Other shields may be positioned upon the machine wherever found desirable.

In operation, assuming that the door 19 is in closed position and the strikeoff hopper in position over the mold box and that a wet mixture is to be molded (the bolt 85 being removed), the material is deposited in the mold box by the conveyor 78. After sufficient material has been tamped into the box, the lever 71 is operated to slide the hopper rearwardly carrying with it the surplus material, except as provided by adjustment of the plate 72. This movement will bring the finishing plate 62 in correct position over the mold box whereupon the tamping operation is again resumed to complete the packing operation. The foot lever 56 is next operated to initially break the core members away from the block B whereupon the hand lever 51' is then operated to completely remove the core members from the mold box.

The next step is to actuate the lever 80 for effecting the sliding upward and forward movement of the bottom 13 so as to break the suction of the block from the end and back plates. In view of the fact that the latch members have also been elevated above the keepers, the door may be moved to lowered position by grasping one or both of the handles 39 whereupon the door is then supported upon the arm 84. The block B can then be removed from the machine upon the pallet 25 and the lever 80 returned to upright position, thereby closing the mold by reason of the arm 84, whereupon the molding operation can again be performed.

It should be stated that each finger of the lever 52 is provided with a set screw 95 which can be adjusted so that its end will abut against one of the bars 50 and thereby space the fingers from the bars so as to effect a greater initial movement if desired and insure simultaneous contact with both bars 50, imparting equal starting movement to both sides of the core carrier 44 when withdrawing the core members 45 from the block B.

From the foregoing it will be apparent that I have provided a novel form of molding machine which is strong and sturdy in construction and in which means have been incorporated for eliminating many objectionable features present in the types of machines now in use.

While it is believed that from the foregoing description, the nature and advantage of my invention will be readily apparent, I desire to have it understood that I do not limit myself to the specific construction herein shown and described and that such changes may be resorted to when desired as fall within the scope of what is claimed.

What I claim as my invention is:

1. In a molding machine, a mold box, a core carrier slidably mounted in said machine, a core member, entirely supported upon said carrier, means for moving said core member into and out of said mold box including a shaft journalled in said machine, a rod secured to said shaft and connected to said core carrier and adapted to move said carrier upon rotation of said shaft, and means independent of said first mentioned means and engageable with said rod for effecting an initial movement of said core member out of said mold box.

2. In a molding machine, a mold box, a core carrier slidably mounted in said machine, a core member supported upon said carrier, means for moving said core member into and out of said mold box including a shaft journalled in said machine, a rod secured to said shaft and connected to said carrier and adapted to move said carrier upon rotation of said shaft, and means independent of said first mentioned means for effecting an initial movement of said core member out of said mold box including a lever on said shaft having a portion thereof engageable with said rod.

3. In a molding machine, a mold box, a core carrier slidably mounted in said machine, a core member supported upon said carrier, means for moving said core member into and out of said mold box including a shaft journalled in said machine, a rod secured to said shaft and connected to said carrier and adapted to move said carrier upon rotation of said shaft, and means independent of said first mentioned means for effecting an initial movement of said core member out of said mold box including a lever pivotally mounted on said shaft and having a portion above said shaft engageable with said rod, and foot operated means for actuating said lever.

4. In a molding machine, a mold box, a core carrier slidably mounted in said machine, a core member supported upon said carrier, means for moving said core member into and out of said mold box including a shaft journalled in said machine, a rod secured to said shaft and connected to said carrier and adapted to move said carrier upon rotation of said shaft, and means independent of said first mentioned means for effecting an initial movement of said core member out of said mold box including a lever pivotally mounted on said shaft intermediate its ends, an arm extending laterally from the top portion of said lever and engageable with said rod, and means engageable with the lower extremity of said lever for actuating the same.

5. In a molding machine, a mold box having back and bottom plates, means mounting said bottom plate for pivotal movement to provide for the removal of the molded material from the mold box, and means for effecting a slight vertical movement of said bottom plate and of the molded material relative to said back plate prior to the pivotal movement of said bottom plate for initially breaking the contact between the molded material and said back plate.

6. In a molding machine, a mold box having back and bottom plates, and means for effecting a slight initial forward and vertical movement of said bottom plate relative to said back plate, said means also effecting a forward and vertical movement of the molded material.

7. In a molding machine, a frame, a mold box supported in said frame and having back and bottom plates, and means for effecting a slight initial movement of said bottom plate relative to said back plates including a shaft eccentrically journaled in said frame and supporting said bottom plate, and means for actuating said shaft.

8. In a molding machine, a frame, a mold box supported in said frame having bottom and front plates constructed as an integral unit, a back plate for said mold box and means for effecting a slight initial movement of said bottom and front plates relative to said back plate whereby an initial movement of the molded material is also effected.

9. In a molding machine, a mold box, a door for said box provided with a central opening and pallet supporting plates mounted in said opening and adjustable relative to said door.

10. In a molding machine, a mold box, a door for said box having a centrally disposed opening therethrough, pallet supporting plates having spaced slotted arms projecting through said opening, and bolts carried by said door and passing through the aforesaid slots for adjustably clamping said plate upon said door.

11. In combination, a molding machine comprising a frame, a mold box mounted in said frame, a strikeoff hopper slidably mounted on said frame, a belt conveyor located above the hopper for depositing material into the mold box and a projection on said hopper constituting an apron and adapted to engage said belt for scraping off particles adhering to said belt and directing the particles into said mold box.

12. In a molding machine, a mold box, a core carrier movable to and from said mold box, a core member supported upon said carrier, and means for angularly adjusting said core member relative to said mold box.

13. In a molding machine, a mold box, a core carrier movable to and from said mold box, a core member supported upon said carrier, and means for adjusting said core member relative to said mold box, said means including a pair of rollers positioned intermediate the ends of the carrier and member and constituting a pivot about which the member is adapted to move, and a second pair of rollers positioned adjacent the end of the carrier and movable relative thereto.

14. In a molding machine, a mold box, a core carrier movable to and from said mold box, a core member supported upon said carrier, and means for adjusting said core member relative to said mold box, said means including a pair of rollers positioned intermediate the ends of the carrier and member and constituting a pivot about which the member is adapted to move, a rod mounted in the end of said carrier and having end portions formed eccentric to the rest of the rod, and rollers mounted upon the ends of said rod.

15. In a molding machine, a frame, a mold box mounted in said frame, a strikeoff hopper slidably mounted on said frame, a finishing plate pivotally mounted upon said hopper, and rollers mounted upon said hopper and engaging said frame for facilitating the sliding movement of the hopper thereon, said rollers being adjustably mounted in said hopper for effecting an adjustment of the hopper relative to said mold box.

16. In a molding machine, a mold box having walls for receiving the material to be molded, and means for effecting a slight initial vertical and horizontal movement of one of the walls relative to other of the walls for breaking contact between the molded material and certain of the walls of the mold box.

17. In a molding machine, a mold box, a strikeoff hopper slidably mounted above said mold box, and brushes carried by said hopper and engageable with the upper edges of the mold box for sweeping the same clear of surplus molding material.

18. In a concrete block molding machine, a mold box, and a conveyer for discharging material to be molded into said mold box, said conveyer having its discharge end arranged above said mold box and in vertical alignment therewith whereby the material may fall from said conveyer into said mold box.

19. In a molding machine, a mold box having back, end, and bottom plates, a shaft mounting said bottom plate for pivotal movement, means for rocking said shaft to impart pivotal movement to said bottom plate and means for moving said shaft upon actuation of said last mentioned means to effect an angular movement of said bottom plate relative to the end and back plates prior to the pivotal movement of said bottom plate.

20. In a molding machine, a frame, a mold box supported in said frame, a door for said mold box pivotally mounted on said frame, latch members carried by said door, keepers carried by said frame and arranged to be engaged by said latch members and means for moving said door to move said latch members out of engagement with said keepers.

21. In a molding machine, a mold box for receiving material to be molded, and means for vertically and horizontally moving one wall of said mold box to move the molded material while the same is within the mold box relative to certain other walls of the mold box to break the contact between the molded material and the said certain other walls.

22. In a molding machine, a mold box, a shaft mounting one wall of said mold box for pivotal movement, means for rocking said shaft to impart pivotal movement to said wall, and means eccentrically mounting said shaft to impart a vertical and horizontal movement to the wall carried by the shaft upon rocking of the shaft.

In testimony whereof I affix my signature.

JOHN D. ABRAM.